(12) United States Patent
Muller et al.

(10) Patent No.: US 7,988,891 B2
(45) Date of Patent: Aug. 2, 2011

(54) MONOPERSULFATE TREATMENT OF MEMBRANES

(75) Inventors: Heinz-Joachim Muller, New South Wales (AU); Dongliang Wang, New South Wales (AU); Nina Elbaz, New South Wales (AU)

(73) Assignee: Siemens Industry, Inc., Alpharetta, GA (US)

( * ) Notice: Subject to any disclaimer, the term of this patent is extended or adjusted under 35 U.S.C. 154(b) by 309 days.

(21) Appl. No.: 11/995,588

(22) PCT Filed: Jul. 14, 2006

(86) PCT No.: PCT/AU2006/000997
§ 371 (c)(1),
(2), (4) Date: Jan. 14, 2008

(87) PCT Pub. No.: WO2007/006104
PCT Pub. Date: Jan. 18, 2007

(65) Prior Publication Data
US 2008/0203018 A1    Aug. 28, 2008

(30) Foreign Application Priority Data
Jul. 14, 2005  (AU) ................. 2005903746

(51) Int. Cl.
B01D 67/00    (2006.01)
B01D 39/00    (2006.01)
B01D 39/14    (2006.01)
B29C 65/00    (2006.01)
(52) U.S. Cl. ............... 264/48; 264/41; 264/49
(58) Field of Classification Search ......... 210/500.27, 210/500.36, 500.41, 500.42, 490; 264/41, 264/48, 49
See application file for complete search history.

(56) References Cited

U.S. PATENT DOCUMENTS

| | | | |
|---|---|---|---|
| 1,994,135 A | 3/1935 | Horowitz |
| 2,658,045 A | 11/1953 | Schildknecht |
| 3,228,876 A | 1/1966 | Mahon |
| 3,275,554 A | 9/1966 | Wagenaar |
| 3,556,305 A | 1/1971 | Shorr |
| 3,625,827 A | 12/1971 | Wildi et al. |
| 3,654,147 A | 4/1972 | Levin et al. |
| 3,693,406 A | 9/1972 | Tobin, III |
| 3,708,071 A | 1/1973 | Crowley |
| 3,725,256 A | 4/1973 | Cooper |
| 3,864,289 A | 2/1975 | Rendall |
| 3,876,738 A | 4/1975 | Marinaccio et al. |
| 3,968,192 A | 7/1976 | Hoffman, III et al. |
| 3,992,301 A | 11/1976 | Shippey et al. |
| 3,993,816 A | 11/1976 | Baudet et al. |

(Continued)

FOREIGN PATENT DOCUMENTS
CN    1552507    12/2004
(Continued)

OTHER PUBLICATIONS

International Search Report dated Aug. 16, 2006 for Application No. PCT/AU2006/000997.

(Continued)

*Primary Examiner* — Ana M Fortuna (57) ABSTRACT

A method of improving the water permeability and/or cleaning a porous polymeric microfiltration or ultrafiltration membrane, preferably a hydrophobic/hydrophilic blended membrane, eg P VdF/PVP comprising the step of contacting the porous polymeric membrane with a source of monopersulfate, preferably an aqueous solution of $2KHSO_5 \cdot KHSO_4 \cdot K_2SO_4$.

26 Claims, 3 Drawing Sheets

U.S. PATENT DOCUMENTS

| | | | |
|---|---|---|---|
| 4,188,817 A | 2/1980 | Steigelmann | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,218,324 A | 8/1980 | Hartmann et al. | |
| 4,230,583 A | 10/1980 | Chiolle et al. | |
| 4,247,498 A | 1/1981 | Castro | |
| 4,248,648 A | 2/1981 | Kopp | |
| 4,253,936 A | 3/1981 | Leysen et al. | |
| 4,278,548 A * | 7/1981 | Bettinger et al. | 210/636 |
| 4,302,336 A | 11/1981 | Kawaguchi et al. | |
| 4,340,479 A | 7/1982 | Pall | |
| 4,353,802 A | 10/1982 | Hara et al. | |
| 4,354,443 A | 10/1982 | Abrahamson | |
| 4,384,474 A | 5/1983 | Kowalski | |
| 4,385,150 A | 5/1983 | Miyake et al. | |
| 4,388,189 A | 6/1983 | Kawaguchi et al. | |
| 4,407,975 A | 10/1983 | Yamaguchi | |
| 4,431,545 A | 2/1984 | Pall et al. | |
| 4,451,369 A | 5/1984 | Sekino et al. | |
| 4,511,471 A | 4/1985 | Müller | |
| 4,519,909 A | 5/1985 | Castro | |
| 4,540,490 A | 9/1985 | Shibata et al. | |
| 4,547,289 A | 10/1985 | Okano et al. | |
| 4,609,465 A | 9/1986 | Miller | |
| 4,614,109 A | 9/1986 | Hofmann | |
| 4,618,533 A * | 10/1986 | Steuck | 428/315.7 |
| 4,623,670 A | 11/1986 | Mutoh et al. | |
| 4,623,690 A | 11/1986 | Patzschke et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis, III | |
| 4,656,865 A | 4/1987 | Callan | |
| 4,660,411 A | 4/1987 | Reid | |
| 4,670,145 A | 6/1987 | Edwards | |
| 4,673,507 A | 6/1987 | Brown | |
| 4,687,561 A | 8/1987 | Kunz | |
| 4,688,511 A | 8/1987 | Gerlach et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,756,875 A | 7/1988 | Tajima et al. | |
| 4,763,612 A | 8/1988 | Iwanami | |
| 4,767,539 A | 8/1988 | Ford | |
| 4,775,471 A | 10/1988 | Nagai et al. | |
| 4,779,448 A | 10/1988 | Gogins | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,840,227 A | 6/1989 | Schmidt | |
| 4,846,970 A | 7/1989 | Bertelsen et al. | |
| 4,855,463 A | 8/1989 | Barua et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,921,610 A | 5/1990 | Ford et al. | |
| 4,931,186 A | 6/1990 | Ford et al. | |
| 4,935,143 A | 6/1990 | Kopp et al. | |
| 4,963,304 A | 10/1990 | Im et al. | |
| 4,968,733 A | 11/1990 | Muller et al. | |
| 4,999,038 A | 3/1991 | Lundberg | |
| 5,005,430 A | 4/1991 | Kibler et al. | |
| 5,015,275 A | 5/1991 | Beck et al. | |
| 5,017,292 A | 5/1991 | DiLeo et al. | |
| 5,019,260 A | 5/1991 | Gsell et al. | |
| 5,024,762 A | 6/1991 | Ford et al. | |
| 5,032,282 A | 7/1991 | Linder et al. | |
| 5,043,113 A | 8/1991 | Kafchinski et al. | |
| 5,049,275 A | 9/1991 | Gillberg-LaForce et al. | |
| 5,066,375 A | 11/1991 | Parsi et al. | |
| 5,066,401 A | 11/1991 | Müller et al. | |
| 5,066,402 A | 11/1991 | Anselme et al. | |
| 5,069,065 A | 12/1991 | Sprunt et al. | |
| 5,075,065 A | 12/1991 | Effenberger et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,137,633 A | 8/1992 | Wang | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,158,721 A | 10/1992 | Allegrezza, Jr. et al. | |
| 5,182,019 A | 1/1993 | Cote et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |
| 5,198,162 A | 3/1993 | Park et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,271,839 A | 12/1993 | Moya et al. | |
| 5,275,766 A | 1/1994 | Gadkaree et al. | |
| 5,286,324 A | 2/1994 | Kawai et al. | |
| 5,288,324 A | 2/1994 | Shaneyfelt | |
| 5,297,420 A | 3/1994 | Gilliland et al. | |
| 5,320,760 A | 6/1994 | Freund et al. | |
| 5,353,630 A | 10/1994 | Soda et al. | |
| 5,354,587 A | 10/1994 | Abayasekara | |
| 5,361,625 A | 11/1994 | Ylvisaker | |
| 5,364,527 A | 11/1994 | Zimmermann et al. | |
| 5,376,274 A | 12/1994 | Muller et al. | |
| 5,389,260 A | 2/1995 | Hemp et al. | |
| 5,396,019 A | 3/1995 | Sartori et al. | |
| 5,401,401 A | 3/1995 | Hickok et al. | |
| 5,403,479 A | 4/1995 | Smith et al. | |
| 5,403,483 A | 4/1995 | Hayashida et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,451,317 A | 9/1995 | Ishida et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,491,023 A | 2/1996 | Tsai et al. | |
| 5,525,220 A | 6/1996 | Yagi et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,543,465 A * | 8/1996 | Bell et al. | 525/182 |
| 5,547,575 A | 8/1996 | Demmer et al. | |
| 5,554,283 A | 9/1996 | Brinda et al. | |
| 5,607,593 A | 3/1997 | Cote et al. | |
| 5,629,084 A | 5/1997 | Moya | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,725,769 A | 3/1998 | Miller et al. | |
| 5,747,605 A | 5/1998 | Breant et al. | |
| D396,046 S | 7/1998 | Scheel et al. | |
| 5,783,083 A | 7/1998 | Henshaw et al. | |
| D396,726 S | 8/1998 | Sadr et al. | |
| D400,890 S | 11/1998 | Gambardella | |
| 5,871,823 A | 2/1999 | Anders et al. | |
| 5,906,742 A | 5/1999 | Wang et al. | |

| | | |
|---|---|---|
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,958,243 A | 9/1999 | Lawrence et al. |
| 5,981,614 A | 11/1999 | Adiletta |
| 5,988,400 A | 11/1999 | Karachevtcev et al. |
| 6,024,872 A | 2/2000 | Mahendran |
| 6,039,872 A | 3/2000 | Wu et al. |
| 6,042,677 A | 3/2000 | Mahendran et al. |
| 6,045,698 A | 4/2000 | Côté et al. |
| 6,045,899 A | 4/2000 | Wang et al. |
| 6,048,454 A | 4/2000 | Jenkins |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,794 A | 9/2000 | Kumara et al. |
| 6,146,747 A | 11/2000 | Wang et al. |
| 6,156,200 A | 12/2000 | Zha et al. |
| 6,159,369 A | 12/2000 | Strohm et al. ........... 210/500.41 |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,294,039 B1 | 9/2001 | Mahendran et al. |
| 6,299,773 B1 | 10/2001 | Takamura et al. |
| 6,315,895 B1 | 11/2001 | Summerton et al. |
| 6,322,703 B1 | 11/2001 | Taniguchi et al. |
| 6,325,928 B1 | 12/2001 | Pedersen et al. |
| 6,337,018 B1 | 1/2002 | Mickols |
| RE37,549 E | 2/2002 | Mahendran et al. |
| 6,354,444 B1 | 3/2002 | Mahendran |
| 6,375,848 B1 | 4/2002 | Cote et al. |
| 6,423,784 B1 | 7/2002 | Hamrock et al. |
| 6,440,303 B2 | 8/2002 | Spriegel |
| D462,699 S | 9/2002 | Johnson et al. |
| 6,448,062 B1 * | 9/2002 | Huth et al. ................... 435/264 |
| 6,465,748 B2 | 10/2002 | Yamanashi et al. |
| 6,491,165 B2 | 12/2002 | Kuske |
| 6,495,041 B2 | 12/2002 | Taniguchi et al. |
| 6,524,481 B2 | 2/2003 | Zha et al. |
| 6,550,747 B2 | 4/2003 | Rabie et al. |
| 6,555,005 B1 | 4/2003 | Zha et al. |
| 6,595,167 B2 | 7/2003 | Kaesgen |
| D478,913 S | 8/2003 | Johnson et al. |
| 6,620,319 B2 | 9/2003 | Behmann et al. |
| 6,635,104 B2 | 10/2003 | Komkova et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,705,465 B2 | 3/2004 | Ling et al. |
| 6,721,529 B2 | 4/2004 | Chen et al. |
| 6,723,246 B2 * | 4/2004 | Krulik ........................ 210/636 |
| 6,723,758 B2 | 4/2004 | Stone et al. |
| 6,727,305 B1 | 4/2004 | Pavez Aranguiz |
| 6,761,013 B2 | 7/2004 | Tippey |
| 6,770,202 B1 | 8/2004 | Kidd et al. |
| 6,783,008 B2 | 8/2004 | Zha et al. |
| 6,790,912 B2 | 9/2004 | Blong |
| 6,793,820 B1 | 9/2004 | McCray et al. |
| 6,811,696 B2 | 11/2004 | Wang et al. |
| 6,821,420 B2 | 11/2004 | Zha et al. |
| 6,830,782 B2 | 12/2004 | Kanazawa |
| 6,851,259 B2 | 2/2005 | Simburger et al. |
| 6,861,466 B2 | 3/2005 | Dadalas et al. |
| 6,872,305 B2 | 3/2005 | Johnson et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,965,033 B2 | 11/2005 | Jiang et al. |
| 6,969,465 B2 | 11/2005 | Zha et al. |
| 6,974,554 B2 | 12/2005 | Cox et al. |
| 6,994,867 B2 | 2/2006 | Hossainy et al. |
| 7,041,728 B2 | 5/2006 | Zipplies et al. |
| 7,070,909 B2 | 7/2006 | Japp et al. |
| 7,128,768 B2 | 10/2006 | Liu et al. |
| 7,226,541 B2 | 6/2007 | Muller et al. |
| 7,300,022 B2 | 11/2007 | Muller |
| 7,390,418 B2 * | 6/2008 | Martin et al. ................. 210/758 |
| 7,395,646 B2 | 7/2008 | Salman |
| 7,404,896 B2 | 7/2008 | Muller |
| 7,449,112 B2 | 11/2008 | Lee et al. |
| 7,459,085 B2 | 12/2008 | Koguma et al. |
| 7,537,718 B2 * | 5/2009 | Mezhirov et al. ................. 264/48 |
| 7,648,034 B2 | 1/2010 | Charkoudian et al. |
| 2002/0148767 A1 | 10/2002 | Johnson et al. |
| 2003/0065302 A1 | 4/2003 | Kuroda |
| 2003/0178365 A1 | 9/2003 | Zha et al. |
| 2003/0226797 A1 | 12/2003 | Phelps |
| 2004/0084369 A1 | 5/2004 | Zha et al. |
| 2004/0085300 A1 | 5/2004 | Matusis |
| 2004/0092901 A1 | 5/2004 | Reece |
| 2004/0145076 A1 | 7/2004 | Zha et al. |
| 2004/0167490 A1 | 8/2004 | Nelson |
| 2004/0167493 A1 | 8/2004 | Jarpenberg |
| 2004/0168947 A1 | 9/2004 | McDonald |
| 2004/0172002 A1 | 9/2004 | Nelson |
| 2004/0176735 A1 | 9/2004 | Snell |
| 2004/0195172 A1 | 10/2004 | Yeh |
| 2004/0217053 A1 | 11/2004 | Zha et al. |
| 2005/0015052 A1 | 1/2005 | Klippen |
| 2005/0032982 A1 | 2/2005 | Muller |
| 2005/0098494 A1 | 5/2005 | Mullette et al. |
| 2006/0157404 A1 | 7/2006 | Mullette et al. |
| 2006/0178480 A1 | 8/2006 | Tada et al. |
| 2007/0007197 A1 | 1/2007 | Mahendran et al. |

FOREIGN PATENT DOCUMENTS

| | | |
|---|---|---|
| DE | 3904544 A1 | 8/1990 |
| DE | 4007383 A | 9/1991 |
| DE | 4117281 A1 | 1/1992 |
| DE | 4113420 A1 | 10/1992 |
| DE | 4117422 C1 | 11/1992 |
| DE | 19503060 | 8/1996 |
| DE | 19503060 A1 | 8/1996 |
| DE | 29906389 | 6/1999 |
| EP | 012557 B1 | 2/1983 |
| EP | 050447 B1 | 10/1985 |
| EP | 229019 B1 | 7/1987 |
| EP | 250337 A1 | 12/1987 |
| EP | 261734 A1 | 3/1988 |
| EP | 407900 A2 | 1/1991 |
| EP | 419396 A1 | 3/1991 |
| EP | 463627 A2 | 1/1992 |
| EP | 492942 A2 | 7/1992 |
| EP | 509663 B2 | 10/1992 |
| EP | 550798 A1 | 7/1993 |
| EP | 492446 B1 | 1/1995 |
| EP | 395133 B1 | 2/1995 |
| EP | 430082 B1 | 6/1996 |
| EP | 581168 | 10/1996 |
| EP | 763758 A1 | 3/1997 |
| EP | 911073 A1 | 4/1999 |
| EP | 920904 A2 | 6/1999 |
| EP | 1034835 A1 | 9/2000 |
| EP | 1052012 A1 | 11/2000 |
| EP | 1236503 B1 | 8/2004 |
| FR | 2620712 | 3/1989 |
| FR | 2674448 | 10/1992 |
| FR | 2850297 A1 | 7/2004 |
| GB | 702911 | 1/1954 |
| GB | 2253572 A | 9/1992 |
| GB | 2390012 | 12/2003 |
| JP | 55-129155 | 6/1980 |
| JP | 58-088007 | 5/1983 |

| | | |
|---|---|---|
| JP | 60-260628 | 12/1985 |
| JP | 61-097006 | 5/1986 |
| JP | 61-107905 | 5/1986 |
| JP | 61-192309 | 8/1986 |
| JP | 61-257203 | 11/1986 |
| JP | 61-263605 | 11/1986 |
| JP | 62-004408 | 1/1987 |
| JP | 62-068828 | 3/1987 |
| JP | 62-114609 | 5/1987 |
| JP | 62-140607 | 6/1987 |
| JP | 62-179540 | 8/1987 |
| JP | 62-250908 | 10/1987 |
| JP | 63-097634 | 4/1988 |
| JP | S63-38884 | 10/1988 |
| JP | 06-027215 | 3/1989 |
| JP | 10-75542 | 3/1989 |
| JP | 01-307409 | 12/1989 |
| JP | 02-031200 | 2/1990 |
| JP | 02-144132 | 6/1990 |
| JP | 02-164423 | 6/1990 |
| JP | 02-284035 | 11/1990 |
| JP | 03-018373 | 1/1991 |
| JP | 03-110445 | 5/1991 |
| JP | 04-187224 | 7/1992 |
| JP | 04-250898 | 9/1992 |
| JP | 04-265128 | 9/1992 |
| JP | 04-310223 | 11/1992 |
| JP | 05-023557 | 2/1993 |
| JP | 05-096136 | 4/1993 |
| JP | 05-131124 | 5/1993 |
| JP | 05-157654 | 6/1993 |
| JP | 05-285348 | 11/1993 |
| JP | 06-071120 | 3/1994 |
| JP | 06-114240 | 4/1994 |
| JP | 06-218237 | 8/1994 |
| JP | 06-285496 | 10/1994 |
| JP | 06-343837 | 12/1994 |
| JP | 07-000770 | 1/1995 |
| JP | 07-024272 | 1/1995 |
| JP | 07-155758 | 6/1995 |
| JP | 07-185268 | 7/1995 |
| JP | 07-185271 | 7/1995 |
| JP | 07-275665 | 10/1995 |
| JP | 08-010585 | 1/1996 |
| JP | 09-141063 | 6/1997 |
| JP | 09-220569 | 8/1997 |
| JP | 09-324067 | 12/1997 |
| JP | 10-156149 | 6/1998 |
| JP | 11-165200 | 6/1999 |
| JP | 11-302438 | 11/1999 |
| JP | 2000-342932 | 12/2002 |
| JP | 2004230280 | 8/2004 |
| JP | 2005154551 | 6/2005 |
| JP | 2005154551 A | 6/2005 |
| KR | 2002031017 | 7/2002 |
| WO | WO 88-06200 | 8/1988 |
| WO | WO 90-00434 | 1/1990 |
| WO | 9117204 | 11/1991 |
| WO | WO 93-02779 | 2/1993 |
| WO | WO 93-15827 | 8/1993 |
| WO | WO 95-34424 | 12/1995 |
| WO | WO 96-07470 A1 | 3/1996 |
| WO | WO 96-41676 | 12/1996 |
| WO | WO 98-22204 | 5/1998 |
| WO | WO 98-25694 | 6/1998 |
| WO | WO 98-28066 | 7/1998 |
| WO | WO 99-01207 | 1/1999 |
| WO | WO 0043115 A1 | 7/2000 |
| WO | WO 0238256 A1 | 5/2002 |
| WO | 02087734 | 11/2002 |
| WO | WO 03068374 | 8/2003 |
| WO | WO 03080228 | 10/2003 |
| WO | 03095078 | 11/2003 |
| WO | WO 03095078 A1 | 11/2003 |
| WO | WO2004/078327 A | 9/2004 |
| WO | WO2004/094049 A | 11/2004 |
| WO | 2005005028 | 1/2005 |
| WO | WO 2005002712 A | 1/2005 |
| WO | WO2005/030916 A | 4/2005 |
| WO | WO2005030916 A3 | 4/2005 |
| WO | 2006002479 | 1/2006 |
| WO | 2006058394 | 8/2006 |

OTHER PUBLICATIONS

Written Opinion of the International Searching Authority Aug. 16, 2006 for Application No. PCT/AU2006/000997.

International Report on Patentability dated Jun. 8, 2007 for Application No. PCT/AU2006/000997.

Hall, R., (1982) "Peroxides and Pproxy Compounds, Inorganic", in Kirk-Othmer Encyclopedia of Chemical Technology, vol. 17, $3^{rd}$ edition, John Wiley & Sons, pp. 14-16.

Almulla et al., Desalmation, 153 (2002), pp. 237-243.

Anonymous, "Nonwoven Constructions of Dyneon ™ THV and Dyneon ™ The Fluorothermoplastics", Research Disclosure Journal, Apr. 1999, RD 420013, 2 pages.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Lloyd, D.R. et al. "Microporous Membrane Formation Via Thermally Induced Phase Separation/Solid-Liquid Phase Separation" *Journal of Membrane Science* (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

White et al., *The Chemical Engineering Journal*, 52 (1993), pp. 73-77.

Zenon, "Proposal for Zee Weed® Membrane Filtration Equipment System for the City of Westminster, Colorado, Proposal No. 479-99," Mar. 2000, entire publication.

International Search Report dated Sep. 13, 2005 for PCT Application No. PCT/AU2005/000961.

Extended European Search Report dated Mar. 3, 2009 for European Patent Application No. 0575700.

International Search Report dated Sep. 30, 2005 for Application No. PCT/AU2005/000975.

International Preliminary Report on Patentability dated Jun. 30, 2006 for Application No. PCT/AU2005/000975.

Supplementary EP Search Report dated Jun. 25, 2007 for European Application No. EP 05 75 6970.

International Preliminary Report on Patentability dated Jul. 12, 2006 for Application No. PCT/AU2006/000864.

International Preliminary Report on Patentability dated Feb. 10, 2006 for Application No. PCT/AU2005/001820.

Kolthoff, I.M., et al., "The Chemistry of Persulfate—The Kinetics and Mechanism of the Decomposition of the Persulfate Ion in Aqueous Medium", Journal of the American Chemical Society, Jul. 1951, vol. 73, pp. 3055-3059.

Dupont Oxone Monopersulfate Compound, product literature (2008) pp. 1-3. http://ww2.dupont.com/Oxone/en_US/assets/downloads/K20101%20Oxon%20General%20Info.pdf.

Ebewele et al.,"Polymer Science and Technology," p. 445.

Houghman et al, "Fluoropolymers: Synthesis," p. 92.

Smolders et al., "Liquid-liquid phase separation in concentrated solutions of non-crystallizable polymers by spinodal decomposition," Kolloid-Z. u. Polymere, 243, 14-20 (1971).

Supplementary EP Search Report dated Apr. 15, 2010 for European Application No. EP 06 74 1265.

Supplementary EP Search Report dated Nov. 25, 2009 for European Application No. EP 06 76 0859.

Chinese Office Action dated Apr. 21, 2010 for Chinese Application No. 200680022006.2.

* cited by examiner

MONOPERSULFATE TREATMENT OF MEMBRANES

FIELD OF THE INVENTION

The invention relates to a post-treatment process to treat hydrophobic/hydrophilic polymer blend membranes to control the water permeability thereof, and to treated hydrophobic/hydrophilic polymer blend membranes prepared by the method. The process is also suitable for cleaning polymeric membranes

BACKGROUND ART

The following discussion is not to be construed as an admission of the state of the common general knowledge.

Synthetic polymeric membranes are known in the field of ultrafiltration (UF) and microfiltration (MF) for a variety of water filtration applications. The properties of the membranes depend upon the physical properties of the membrane i.e. the symmetry or asymmetry, pore shape, pore size, and on the chemical nature of the polymer and material used to form the membrane.

Particularly important is the hydrophilic or hydrophobic nature of the membrane.

Hydrophobic surfaces are defined as "water hating" while hydrophilic surfaces are defined as "water loving".

It is well recognized that the hydrophilic membranes generally suffer less adsorptive fouling than hydrophobic membranes. However, hydrophobic membranes usually offer better chemical, thermal and biological stability. In the development of water filtration membranes, there has been a long felt need to combine the low-fouling properties of hydrophilic polymers with the stability of hydrophobic polymers.

One approach to preparing porous polymeric membranes that possess the desirable properties of both hydrophilic and hydrophobic membranes has been simply to make various membranes from various blends of hydrophobic/hydrophilic polymers.

Previous processes for treating hydrophobic/hydrophilic blend membranes for increasing water permeability have been detailed, such as the treatment of poly(ethersulfone)/polyvinyl pyrrolidone membranes, polysulfone)/polyvinyl pyrrolidone membranes and polyvinylidene fluoride blend membranes with $Cl_2$ as disclosed in U.S. Pat. No. 6,596,167, for example.

The present applicant has also previously explored the option of hydrophilising membranes by the use of other oxidative species, such as Fenton's agent, a source of hydroxyl radicals, in an attempt to increase water permeability of hydrophobic/hydrophilic membranes However, there remains in the art the need for a simple process to treat membranes to increase the water permeability. It is important that any such treatment does not diminish the mechanical or other chemical properties of the membrane. It is also important that the treatment be as cost effective as possible. Further, given the extensive use of porous polymeric membranes in water filtration, it is highly desirable if the treatment does not introduce the use of potentially toxic or environmentally unfriendly species into a membrane environment.

It is also highly desirable from an efficiency point of view if the processes for treating membranes can be employed in other beneficial ways, for example, in the cleaning of membranes.

DESCRIPTION

According to a first aspect, the invention provides a method of hydrophilising a polymer comprising the step of contacting said polymer with a source of monopersulfate (contacting the polymer with $HSO_5^-$) to render the polymer hydrophilic.

More specifically, the invention provides a method of improving the water permeability of a porous polymeric membrane comprising the step of contacting said porous polymeric membrane with a source of monopersulfate (contacting the porous polymeric membrane with $HSO_5^-$).

In another aspect, the invention provides a method of cleaning a porous polymeric membrane in need thereof comprising the step of contacting said porous polymeric membrane with a source of monopersulfate (contacting the porous polymeric membrane with $HSO_5^-$). The membrane may be fouled with organic matter, inorganic matter or a combination thereof.

Preferably the porous polymeric membrane is a microfiltration or ultrafiltration membrane.

Most preferably the polymeric membrane is prepared from a blend of a hydrophobic and a hydrophilic polymer.

Suitable hydrophobic polymers include fluoropolymers, polysulfone-like polymers, polyimides, polyacrylnitriles, polyvinylchloride and the like.

Most preferably the polymers are fluoropolymers such as polyvinylidene fluoride (PVdF) and PVdF copolymers.

In an alternative preferred embodiment, the hydrophobic polymers are polysulfone-like polymers such as polysulfone, polyethersulfone, and polyphenylsulfone.

Preferably in the hydrophobic/hydrophilic polymer blend, the hydrophilic polymers are polyvinyl pyrrolidone (PVP) and PVP copolymers, polyethylene glycol (PEG) polyethylene oxide, polyvinyl alcohol, polyacrylic acid and the like. Most preferably the hydrophilic polymers are water-soluble polyvinyl pyrrolidone (PVP) and PVP copolymers.

The porous polymeric membranes are preferably prepared from blends of hydrophobic and hydrophilic polymers. The ratio of hydrophobic polymer/hydrophilic polymer in the polymer blend prior to membrane preparation can be 10:1 to 0.5:1. Preferably, the ratio is 5:1 to 0.5:1, and even more preferably the ratio is 3:1 to 0.5:1. The ratio will usually be higher in the final polymer, because the amount of hydrophilic polymer reduces relative to the amount of hydrophobic polymer during membrane formation. However, if the membrane is hydrophilic, then some hydrophilic polymer has been retained. All things being equal, a higher starting proportion of hydrophilic polymer in the polymer blend will usually result in a higher level of incorporation of hydrophilic polymer or copolymer in the final porous polymeric membrane.

Where hydrophobic/hydrophilic membranes are discussed in the specification, it is to be understood that the hydrophilic polymer or copolymer is present in the membrane in an amount sufficient to impart hydrophilicity to the membrane. For example, a PVdF/PVP porous polymeric membrane will have sufficient PVP to impart hydrophilicity to the membrane.

Preferred forms of the membrane are hollow fibre membrane, tubular membrane, or flat sheet membrane.

The membranes can be dry membranes, wet membranes or rewetted membranes. The membranes can be individual or arranged in bundles or modules such as hollow fibre modules or spiral wound modules.

Most preferably, the hydrophobic hydrophilic blend membranes are PVdF/PVP blend membranes or PVdF/PVP copolymer blend membranes. Preferably these membranes are formed by a phase inversion process, and most preferably by diffusion induced phase separation. Preferably the membranes are asymmetric.

In one preferred embodiment, the membranes are treated immediately after casting or extrusion. Preferably the membranes are cast from PVdF/PVP (or PVdF/PVP copolymer) solvent dope which is contacted with a non-solvent in a quench bath and which is further washed in a wash bath to produce a nascent wet membrane.

In this preferred embodiment, the hydrophilising treatment is carried out on the nascent wet membrane. In this case, the nascent wet membrane is contacted with a source of monopersulfate in order to carry out the treatment process.

Preferably the monopersulfate is added in the form of an aqueous solution of monopersulfate anions. Most preferably the monopersulfate is added as potassium monopersulfate, and is preferably in conjunction with potassium hydrogen sulfate and potassium sulfate. Preferably the concentration of monopersulfate is in the range of 0.1 wt % to 10 wt %, and most preferably 0.2 wt % to 5 wt %.

Alternatively, the process can be carried out on a dry membrane. The dry membranes may be prepared by one of two processes, either by directly drying without pore filling agent treatment, or by first treating with a pore filling agent like glycerol and then drying.

The process may also be carried out on rewet membranes. These are membranes that have been dried (either with or without pore filling agent) and then rewetted with water or other liquid.

Additives can also be present in the monopersulfate solution. Additives maybe added, for example, to enhance the oxidation of the hydrophilic polymer, or to otherwise catalyse the reaction. Suitable additives include organic acids and/or metal ions. Without wishing to be bound by theory, it is believed that the organic acids are responsible for enhancing the oxidizing ability for the hydrophilic polymer. The most preferred organic acid is citric acid. Without wishing to be bound by theory, it is believed that the metal ions are as catalyst for the monopersulfate for oxidizing or cross-linking the hydrophilic polymer. The most preferred metal ions are $Ni^{2+}$, $Cu^{2+}$ and $Fe^{2+}$. The concentration of said additives can be between 0.01 wt % and 1 wt %, and most preferably in the range 0.05 wt % to 0.5 wt %.

Preferably the treatment carried out at a temperature of between 5° C. and 95° C., and most preferably in the range of 15° C. to 60° C.

Preferably the membrane is contacted with the monopersulfate solution and is allowed to absorb the solution. Preferably the solution is allowed to contact the membrane for a period of greater than 10 hours at room temperature.

In an alternative preferred embodiment, the monopersulfate solution is allowed to contact the membrane at temperatures over 40° C. for times less than 1 hour.

According to another aspect the invention provides a hydrophilised polymer prepared by the method of the first aspect.

THE BEST METHOD OF PERFORMING THE INVENTION

The invention will be described with respect to PVdF/PVP and PVdF/PVP copolymer blends, although it will be apparent to those skilled in the art that any blend of hydrophobic/hydrophilic polymer membrane can be used. The invention will also be described with reference to the use of one commercially available monopersulfate source, Oxone®, a proprietary Du Pont product which contains potassium monopersulfate, potassium hydrogen sulfate and potassium sulfate. However, it would be appreciated again by those skilled in the art that any suitable source of monopersulfate ($HSO_5^-$) can be used.

The active ingredient in Oxone® is $KHSO_5$. Structurally, the monopersulfate ion is represented as follows:

In solid form, Oxone® exists as a triple salt of formula 2 $KHSO_5.KHSO_4.K_2SO_4$ In preferred embodiments, a mixture of PVdF/PVP or a mixture of PVdF/PVP copolymer are prepared in the solvent in accordance with standard membrane preparation procedure and various additives are added as required to produce a membrane dope. The dope is then cast into a flat sheet membrane or extruded in to a hollow fibre by way of a diffusion induced phase separation process i.e. the casting or extrusion takes place into a suitable non-solvent. Once the membrane is cast or extruded, the solvent and various additives used to facilitate production are removed by way of exchange with non-solvents in a quench bath and the membrane is then washed in a wash bath to produce a nascent wet membrane. The nascent wet membrane is typically then treated with a solution containing Oxone® under predetermined conditions of concentration, temperature and time. The pH maybe anywhere in the range of from 1 to 10 and can be adjusted by the addition of base as required.

In one preferred embodiment of the present invention, the membrane is first allowed to absorb the Oxone® solution and the solution loaded membrane is then kept in a wet state for a period of greater than 10 hours at room temperature. This process is particular amenable to membranes for bundles or modules which can be immersed into the monopersulfate solution for a given time, then removed from the solution and simply kept wet for more than 10 hours.

However, as mentioned earlier, treatment time can be varied depending on the temperature. Suitable treatment times can range typically from half an hour to 24 hours depending on the temperature. A temperature of more than 40° C. the time can be less than 1 hour. Preferably, additives of metal ions and organic ions are added to the Oxone® solution to facilitate the treatment process. Once the membrane has been treated, it can then be dried. In one particular process, the wet membrane is simply dried directly without any pore filling agent treatment. In an alternative process, wet membranes are first treated with a pore filling agent like glycerol and then dried. The membranes can then be rewetted with water or other suitable liquid.

In addition to treating membranes to increase their permeability, monopersulfate solutions have also been found to be advantageous in the cleaning of ultrafiltration and microfiltration membranes. Typically, water containing solutes and precipitates is passed through a bank of semipermeable tubular membranes housed in a module, often at elevated pressures. The filtered water is drawn off and collected, leaving a residue of solid material in the membrane pores or on the unfiltered side of the membrane.

It is preferred that the pores of the membrane be kept relatively free of contaminants. As the amount of pore blockage increases, the filtration efficiency of the module decreases and the amount of pressure required to maintain a viable throughput of liquid increases. As pressure increases, the likelihood of membrane rupture becomes more significant.

In some cases, the water containing impurities is pretreated with a flocculating agent prior to filtration to coagulate dispersed colloids into 'flocs'. Flocs have the advantage of entrapping smaller colloidal particles, thereby making filtration more efficient. They may also aid in the removal of dissolved particles. Under the influence of a flocculating agent, dissolved and suspended particles coagulate and precipitate from the water, thereby removing colour, and turbidity.

Thus, in practice, the filtrate containing the suspended particulate impurities, colloids, bacteria, flocs or the like is passed through the filtration unit under pressure, expelling filtered water and leaving the residue trapped within the unit, and more particularly on the waste side of the membrane and in the pores of the membrane. Flocs are particularly problematical in causing membrane blockage, and membrane performance gradually diminishes with use until it becomes necessary to clean the membranes. The extent of the problem depends upon the amount of impurity, the nature of the impurity and the type of the membrane. 'Backwashing', that is, running the current of water (or a gas) counter to the normal direction of flow, can dislodge some the contaminants from the membrane, however, it is difficult to achieve complete removal of particulate matter, especially when flocculants have been used.

Chemical cleans are therefore still useful.

Solutions of monopersulfate anions, particularly solutions of Oxone®, have been found to be very useful in cleaning fouled membranes. The methods of the present invention can be used in conjunction with backwashing methodology, or as a stand-alone cleaning method suitable for carrying out "cleaning-in-place" (CIP). CIP involves cleaning the membrane module without removal from its normal in situ place of operation.

In general terms, one form of CIP cleaning involves isolating the module to be cleaned by means of taps and pipes and the like from fluid communication with the remainder of the system. The water or liquid normally filtered is then replaced with a cleaning fluid, in this case, an Oxone® solution. The Oxone® solution is then allowed to run through the membrane module to carry out the cleaning. The Oxone® solution may be recycled through the module, or allowed to pass through the module just once before being run off to waste, depending upon the particular requirements of the system and the amount of contaminants being removed.

The CIP procedure can take place at ambient temperatures or at controlled temperatures outside the normal range of filtration temperatures. The CIP can be carried out for varying lengths of time and at pressures outside the normal range of those used for filtration.

Once the cleaning is completed, the system is flushed to remove traces of the Oxone® solution before being returned to service by being reconnected to the normal fluid flow.

CIP can be carried out manually or by means of fully automated systems which activate in response to pressure differentials or after predetermined module operating times.

One example of a module that can be cleaned has banks of hollow fibre PVDF membranes housed in membrane modules as described in U.S. Pat. No. 6,159,373, the contents of which are incorporated herein by reference. The module includes a shell within which is positioned a bundle containing from about 2800 to about 30,000 hollow fibres with a diameter of 500 µm to 650 µm and a lumen diameter of 250 µm to 310 µm, with a pore size of 0.2 µm, but these sizes may be varied as required. Membrane and module configurations different from the one described above may also be employed with the methods of preferred embodiments, as will be appreciated by one skilled in the art.

At each end of the fibre bundle, a potting compound holds the ends of the fibres in place without blocking the lumens and closes off each end of the module. The liquid feed is pumped into the module, between the shell and the outside of the hollow fibres. Some of the feed liquid passes into the lumen of the fibres, being filtered as it does so. The clean liquid then concentrates in the inside of the lumen, and flows, or is drawn off and taken outside the module, as a clarified liquid.

In one form of the CIP treatment, a solution of monopersulfate anions is introduced in place of the untreated liquid stream. However, those skilled in the art will realize that the flow could be introduced counter to that normally used.

The results obtained showed that monopersulfate treatment could clean fouled membranes such that their permeability was returned to, or close to, pre fouling levels.

EXAMPLE 1

A PVdF/PVP fibre was treated with a 1.2 wt % potassium monopersulfate (5 wt % Oxone®) solution at a different temperature for various times. The results are given in table 1. Permeabilities are given in units of LMH/bar (=LMH/100 kPa), which is familiar to those skilled in the art, and represents the flux of pure water through the membrane in terms of the number of litres (L) per square metre (M) of membrane per hour (H) at 1 bar driving pressure (bar).

TABLE 1

| | Treatment Time (hr) | | | | | | |
|---|---|---|---|---|---|---|---|
| | 0 | 1 | 2 | 3 | 4 | 17 | 24 |
| | 40° C. | | | | | | |
| Permeability (LMH/bar) | 30 | 734 | 1080 | 912 | 720 | | |
| | 25° C. | | | | | | |
| Permeability (LMH/bar) | 50 | | 100 | | 280 | 1000 | 900 |

It can be seen that at a temperature of 40° C., optimal permeability was achieved after around 2 hours. The permeability of 1080 LHM/Pa is substantially greater than the pre-treatment figure of 30 LHM/Pa. At a temperature of 25° C., it can be seen that optimum permeability was achieved after 17 hours.

EXAMPLE 2

A variety of different membrane modules were treated with the Oxone® solution at various concentrations for 24 hours at room temperature. The permeability both before and after treatment with the monopersulfate solution was measured. The results are shown in Table 2.

TABLE 2

| Oxone® concentration (wt %) | Permeability Before Treatment | Permeability After Treatment | % Increase in permeability |
|---|---|---|---|
| 5 | 147 | 273.8 | 86 |
| 5 | 144 | 252.8 | 46 |
| 2 | 147 | 259.6 | 77 |
| 2 | 200 | 299 | 50 |
| 2 | 177 | 314 | 77 |

In all cases, the permeability of the module was substantially increased subsequent to monopersulfate treatment.

EXAMPLE 3

A module was immersed in a 2% Oxone® solution for 2 hours, removed and stored in a plastic bag for 24 hours at room temperature without drying. The permeability increased from 188 LHM/100 Pa to 332 LHM/100 kPa.

The processes were found to be effective at a wide range of pHs between pH 1 and pH 10. The process is applicable to wet membranes and rewetted membranes, and is equally applicable to dry membranes. Membranes can be treated singly i.e. in sheets or hollow fibres or can be treated in bundles or modules.

Investigations of the treated membranes and modules indicated that the mechanical strength and mechanical properties of the membranes, such as the bubble point, break force and break extension were unaltered by the monopersulfate treatment.

Because of the nature of the Oxone® solution, which can be readily removed by the washing treatment, the treated MF or UF membranes can be used for the filtration of drinking water as well as for waste water treatment.

EXAMPLE 4

Transition-Metal Activation of Oxone®

The ability of transition metals to activate Oxone® was investigated. PVdF membrane bundles were placed in treatment solutions, which had compositions as shown in Table 3. The permeabilities were measured at 2, 4, 6, 8, 10 and 24 hour intervals.

TABLE 3

Transition-metal/Oxone® solution compositions

| Fibre | [Oxone ®]/wt % | Additive | wt % of Additive |
|---|---|---|---|
| PVdF | 2 | — | — |
| PVdF | 2 | $FeSO_4 \cdot 7H_2O$ | 0.003 |
| PVdF | 2 | $CuSO_4$ | 0.0017 |
| PVdF | 2 | $MnSO_4 \cdot H_2O$ | 0.0018 |
| PVdF | 2 | $Co(C_2H_3O_2) \cdot 4H_2O$ | 0.0027 |
| PVdF | 2 | KI | 0.142 |

Figure 1:
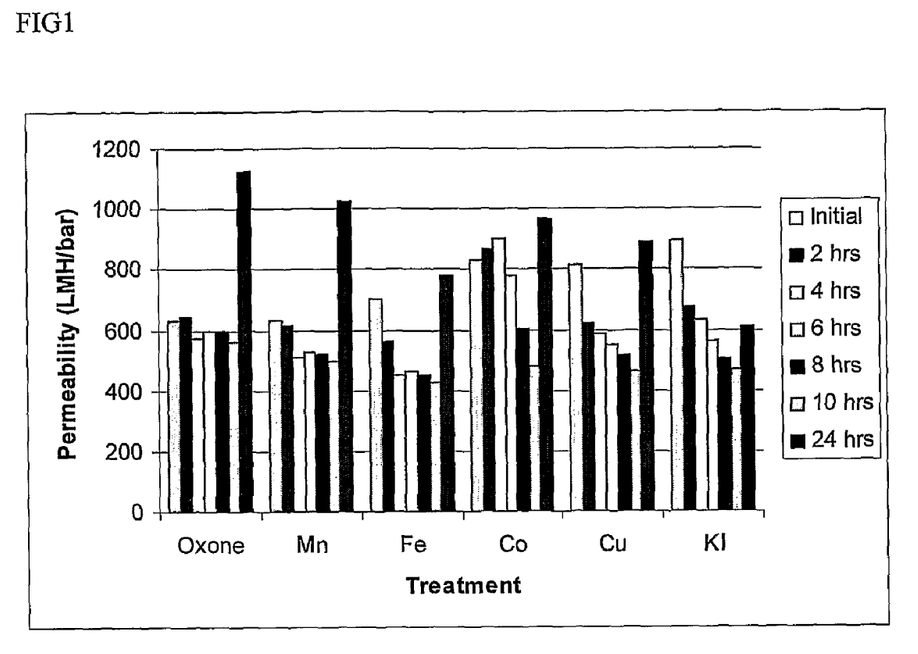
FIG. 1 is a graph that represents the changes in membrane permeability versus different treatment conditions.

The results are shown in FIG. 1, which illustrates permeability variations over time for PVdF fibres.

Another option that was tested was to combine Oxone® with both cobalt (II) and iron (II). It has been established in the literature that Co (II) oxidises to Co(III) in the presence of Oxone® to produce sulfate radicals and that Co(III) reduces to Co(II) with Oxone® to produce peroxymonosulfate radicals. It is believed that the sulfate radical is the powerhouse behind the reactions that improve permeability. However, the peroxymonosulfate radical is much weaker than the sulfate radical, thus it is assumed that it has negligible contribution to the reaction scheme. It was then decided to add Fe(II) in an attempt to reduce Co(III) to Co(II) so that more sulfate radicals were produced from the Oxone®. This treatment performed well for the PVdF fibres.

EXAMPLE 5

Cleaning of Membranes

Fouled PVdF/PVP hollow fibre membranes were treated (allowed to soak) over a 24 hour period with Oxone® solutions at 0.5 wt %, 1.0 wt % and 2 wt % at both room temperature 21° C. and at refrigerated temperature (less than 4° C.).

Figure 2:
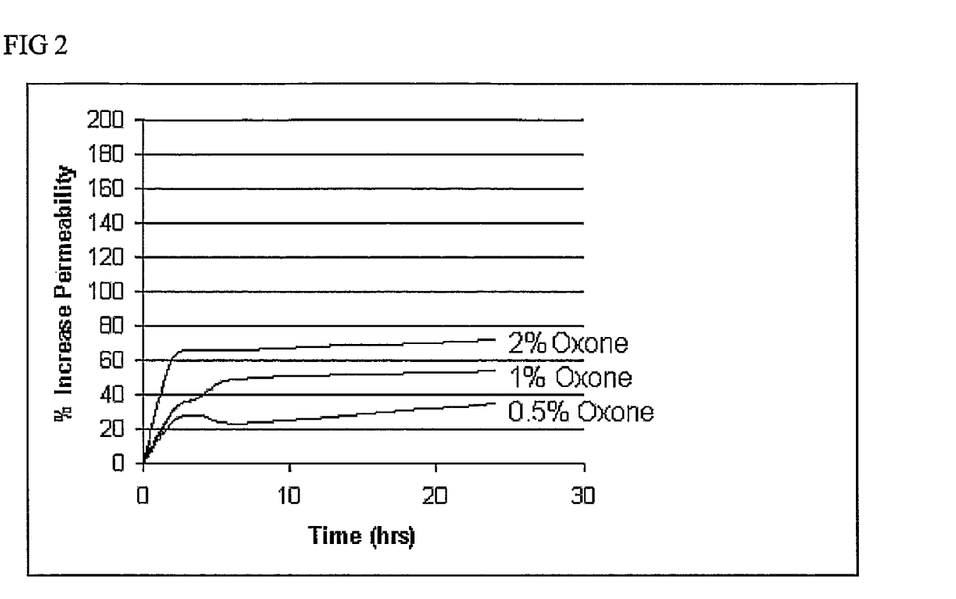
FIG. 2 is a graph that represents the change in membrane permeability versus monopersulffute (Oxone®) treatment at different concentrations and different treatment times.
Figure 3:
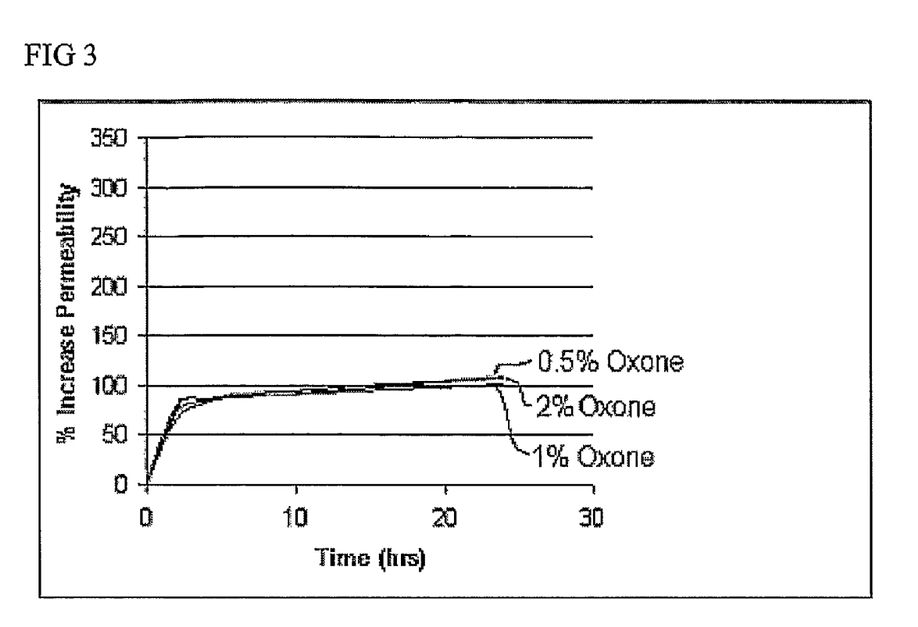
FIG. 3 is a graph that represents the change in membrane permeability versus monopersulfate (Oxone®) treatment at different concentrations and different treatment times.

At refrigerated temperatures, after 24 hours, a 30-70% increase in permeability was obtained (FIG. 2). However, after 24 hours, all the samples at room temperature showed a 100% increase in permeability (FIG. 3).

The invention claimed is:

1. A method of making a porous polymeric membrane having increased water permeability comprising:
   preparing a blend comprising a hydrophobic polymer and a hydrophilic polymer;
   forming the porous polymeric membrane from the blend; and
   oxidizing the porous polymeric membrane with an aqueous solution comprising 0.1 weight % to 10 weight % monopersulfate for a predetermined time and at a temperature at or below 40° C.

2. The method according to claim 1, wherein the porous polymeric membrane is a microfiltration or ultrafiltration membrane.

3. The method according to claim 1, wherein the hydrophobic polymer is selected from the group consisting of fluoropolymers, polysulfone-like polymers, polyimides, polyacrylnitriles and polyvinylchloride.

4. The method according to claim 3, wherein the hydrophobic polymer is a fluoropolymer selected from the group consisting of polyvinylidene fluoride (PVdF) and PVdF copolymers.

5. The method according to claim 3, wherein the hydrophobic polymer is a polysulfone-like polymer selected from the group consisting of polysulfone, polyethersulfone, and polyphenylsulfone.

6. The method according to claim 1, wherein the hydrophilic polymer is selected from the group consisting of polyvinyl pyrrolidone (PVP) and PVP copolymers, polyethylene glycol (PEG) polyethylene oxide, polyvinyl alcohol and polyacrylic acid.

7. The method according to claim 6, wherein the hydrophilic polymer is a water-soluble polyvinyl pyrrolidone (PVP) polymer or copolymer.

8. The method according to claim 1, wherein the porous polymeric membrane comprises a polyvinylidene fluoride (PVdF) and polyvinyl pyrrolidone (PVP) blend or a PVdF/PVP copolymer blend.

9. The method according to claim 1, wherein the monopersulfate is potassium monopersulfate.

10. The method according to claim 9, wherein the monopersulfate comprises potassium monopersulfate, potassium hydrogen sulfate and potassium sulfate.

11. The method according to claim 10, wherein the monopersulfate is a triple salt of formula $2KHSO_5 \cdot KHSO_4 \cdot K_2SO_4$.

12. The method according to claim 1, wherein the concentration of monopersulfate in the aqueous solution is in the range of 0.2 wt % to 5 wt %.

13. The method according to claim 1, wherein the aqueous solution of monopersulfate comprises an additive.

14. The method according to claim 13, wherein the additive comprises an organic acid.

15. The method according to claim 14, wherein the organic acid is citric acid.

16. The method according to claim 13, wherein the additive comprises a metal ion.

17. The method according to claim 1, wherein the membrane is formed by a phase inversion process.

18. The method according to claim 17, wherein the membrane is formed by diffusion induced phase separation.

19. The method according to claim 1, wherein the porous polymeric membrane is a membrane selected from the group consisting of a dry membrane, a wet membrane and a rewetted membrane.

20. The method according to claim 1, wherein the membrane is in a form selected from the group consisting of a hollow fiber membrane, a tubular membrane, and a flat sheet membrane.

21. The method according to claim 1, wherein the membrane is arranged in modules selected from the group consisting of hollow fiber modules and spiral wound modules.

22. The method according to claim 1, wherein forming said porous polymeric membrane from the blend comprises casting the membrane.

23. The method according to claim 1, wherein forming said porous polymeric membrane from the blend comprises extruding the membrane.

24. The method according to claim 16, wherein the metal ion is selected from the group consisting of $Ni^{2+}$, $Cu^{2+}$ and $Fe^{2+}$, or combinations thereof.

25. The method according to claim 22 or 23, wherein contacting the porous polymeric membrane occurs after casting or extrusion.

26. The method according to claim 25, wherein contacting the porous polymeric membrane occurs after casting or extrusion as a nascent wet membrane.

* * * * *